(12) United States Patent
Falk et al.

(10) Patent No.: US 12,483,849 B2
(45) Date of Patent: Nov. 25, 2025

(54) RENDERING OF AUDIO OBJECTS WITH A COMPLEX SHAPE

(71) Applicant: Telefonaktiebolaget LM Ericsson (publ), Stockholm (SE)

(72) Inventors: Tommy Falk, Spånga (SE); Werner De Bruijn, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 244 days.

(21) Appl. No.: 17/910,990

(22) PCT Filed: Mar. 10, 2021

(86) PCT No.: PCT/EP2021/056112
§ 371 (c)(1),
(2) Date: Sep. 12, 2022

(87) PCT Pub. No.: WO2021/180820
PCT Pub. Date: Sep. 16, 2021

(65) Prior Publication Data
US 2023/0132745 A1    May 4, 2023

Related U.S. Application Data

(60) Provisional application No. 62/988,983, filed on Mar. 13, 2020.

(51) Int. Cl.
*H04S 7/00*       (2006.01)
*G06T 19/00*      (2011.01)

(52) U.S. Cl.
CPC ............ *H04S 7/302* (2013.01); *G06T 19/006* (2013.01); *H04S 2400/11* (2013.01); *H04S 2420/01* (2013.01)

(58) Field of Classification Search
CPC .. H04S 7/302; H04S 2400/11; H04S 2420/01; H04S 2420/13; G06T 19/006; G06T 13/205; H04R 5/02
(Continued)

(56) References Cited

U.S. PATENT DOCUMENTS 10,425,762 B1    9/2019 Schissler
2020/0128347 A1* 4/2020 Schissler ................. H04S 3/008
(Continued)

FOREIGN PATENT DOCUMENTS

WO    2019/121773 A1    6/2019

OTHER PUBLICATIONS

International Search Report and Written Opinion issued in International Application No. PCT/EP2021/056112 dated Jun. 16, 2021 (13 pages).
(Continued)

*Primary Examiner* — Antim G Shah
*Assistant Examiner* — Sabrina Diaz
(74) *Attorney, Agent, or Firm* — Rothwell, Figg, Ernst & Manbeck, P.C.

(57) ABSTRACT

A method (900) for representing an audio object in an extended reality scene. The method includes obtaining (s902) first metadata describing a first three-dimensional (3D) shape associated with the audio object. The method also includes transforming (s904) the obtained first metadata to produce transformed metadata describing a two-dimensional (2D) plane or a one-dimensional (1D) line, wherein the 2D plane or the 1D line represent at least a portion of the audio object.

19 Claims, 10 Drawing Sheets

(58) Field of Classification Search
USPC .................................. 381/1, 300, 309, 310
See application file for complete search history.

(56) References Cited

U.S. PATENT DOCUMENTS

| | | | |
|---|---|---|---|
| 2020/0275230 A1* | 8/2020 | Laaksonen | G06F 3/012 |
| 2021/0092546 A1* | 3/2021 | Terentiv | H04S 7/303 |
| 2021/0289309 A1* | 9/2021 | Herre | H04S 7/303 |
| 2021/0306792 A1* | 9/2021 | De Bruijn | H04S 7/302 |

OTHER PUBLICATIONS

Schissler, C. et al., "Efficient HRTF-based Spatial Audio for Area and Volumetric Sources", IEEE Transactions on Visualization and Computer Graphics, vol. 22, No. 4, Apr. 2016 (11 pages).

Garland, M. et al., "Surface Simplification Using Quadric Error Metrics", Carnegie Mellon University, 1997 (8 pages).

Huebner, K. et al., "Minimum Volume Bounding Box Decomposition for Shape Approximation in Robot Grasping", 2008 IEEE International Conference on Robotics and Automation, May 2008 (6 pages).

ISO/IEC 23008-3:201x(E), "Information technology—High efficiency coding and media delivery in heterogeneous environments—Part 3: 3D audio", ISO/IEC JTC 1/SC 29, Oct. 12, 2016 (23 pages).

EBU Operating Eurovision and Euroradio Tech 3388, "ADM Renderer for Use in Next Generation Audio Broadcasting", Source: BTF Renderer Group, Specification Version 1.0, Geneva, Mar. 2018 (57 pages).

* cited by examiner

RENDERING OF AUDIO OBJECTS WITH A COMPLEX SHAPE

CROSS REFERENCE TO RELATED APPLICATIONS

This application is a 35 U.S.C. § 371 National Stage of International Patent Application No. PCT/EP2021/056112, filed Mar. 10, 2021, which claims priority to U.S. provisional application No. 62/988,983, filed on Mar. 13, 2020. The above identified applications are incorporated by this reference.

TECHNICAL FIELD

Disclosed are embodiments related to rendering of audio objects with a complex shape.

BACKGROUND

Spatial audio rendering is a process used for presenting audio within an extended reality (XR) scene (e.g., a virtual reality (VR), augmented reality (AR), or mixed reality (MR) scene) in order to give a listener the impression that sound is coming from physical sources within the scene at a certain position and having a certain size and shape (i.e., extent). The presentation can be made through headphone speakers or other speakers. If the presentation is made via headphone speakers, the processing used is called binaural rendering and uses spatial cues of human spatial hearing that make it possible to determine from which direction sounds are coming. The cues involve inter-aural time delay (ITD), inter-aural level difference (ILD), and/or spectral difference.

The most common form of spatial audio rendering is based on the concept of point-sources, where each sound source is defined to emanate sound from one specific point. Because each sound source is defined to emanate sound from one specific point, the sound source doesn't have any size or shape. In order to render a sound source having an extent (size and shape), different methods have been developed.

One such known method is to create multiple copies of a mono audio object at positions around the audio object. This arrangement creates the perception of a spatially homogeneous object with a certain size. This concept is used, for example, in the "object spread" and "object divergence" features of the MPEG-H 3D Audio standard (see references [1] and [2]), and in the "object divergence" feature of the EBU Audio Definition Model (ADM) standard (see reference [4]). This idea using a mono audio source has been developed further as described in reference [7], where the area-volumetric geometry of a sound object is projected onto a sphere around the listener and the sound is rendered to the listener using a pair of head-related (HR) filters that is evaluated as the integral of all HR filters covering the geometric projection of the object on the sphere. For a spherical volumetric source this integral has an analytical solution. For an arbitrary area-volumetric source geometry, however, the integral is evaluated by sampling the projected source surface on the sphere using what is called a Monte Carlo ray sampling.

Another rendering method renders a spatially diffuse component in addition to a mono audio signal, which creates the perception of a somewhat diffuse object that, in contrast to the original mono audio object, has no distinct pin-point location. This concept is used, for example, in the "object diffuseness" feature of the MPEG-H 3D Audio standard (see reference [3]) and the "object diffuseness" feature of the EBU ADM (see reference [5]).

Combinations of the above two methods are also known. For example, the "object extent" feature of the EBU ADM combines the creation of multiple copies of a mono audio object with the addition of diffuse components (see reference [6]).

In many cases the actual shape of an audio object can be described well enough with a basic shape (e.g., a sphere or a box). But sometimes the actual shape is more complicated and needs to be described in a more detailed form (e.g., a mesh structure or a parametric description format). In such cases, rendering of the audio object requires a real-time evaluation of how the audio object should be rendered based on the current relative position of the listener with respect to the audio object. This real-time evaluation can be processing intensive.

SUMMARY

Existing methods for rendering a volumetric audio object generally use a single point-source to represent the audio object and set the position of the point-source as the center of the audio object (see e.g., FIG. 1). This means that the height and the width of the audio object is not represented. More elaborate methods of rendering volumetric audio objects exist. Such methods try to represent the shape of an audio object but they are limited to mono sources. This results in the audio object being rendered as spatially-homogeneous or spatially diffuse. In both cases, the rendering is based on a mono recording with no spatial information.

Another option for rendering a volumetric audio object is to represent the audio object using a multitude of point-sources that together make up the sound emanating from the audio object. This method, however, is highly inefficient due to the number of point-sources that are needed for an accurate representation of the shape of the object from different angles. The number of point-sources would also need to be increased proportionally with the size of the object.

This disclosure, therefore, supports the use of audio objects with a defined size and shape that are represented by a multi-channel audio signal where the different channels represent the spatial information of the audio object in different dimensions. One example is a stereo recording that represents the spatial information along the horizontal dimension of the audio object. More specifically, this disclosure provides a method that simplifies a three-dimensional (3D) shape of an audio object into a one-dimensional (1D) or two-dimensional (2D) representation that describes the width and/or height of the audio object as seen from the listener's position. The multi-channel audio signal is then rendered so that the perceived spatial extent matches that of the simplified extent.

Accordingly, in one aspect there is provided a method for representing an audio object in an extended reality scene. The method comprises obtaining first metadata describing a first three-dimensional (3D) shape associated with the audio object. The method also comprises transforming the obtained first metadata to produce transformed metadata describing a two-dimensional (2D) plane or a one-dimensional (1D) line. The 2D plane or the 1D line represent at least a portion of the audio object.

In another aspect there is provided a computer program comprising instructions which when executed by processing circuitry causes the processing circuitry to perform the above described method. In one embodiment, there is provided a carrier containing the computer program wherein the carrier is one of an electronic signal, an optical signal, a radio signal, and a computer readable storage medium.

In another aspect there is provided an apparatus for representing an audio object in an extended reality scene. The apparatus is adapted to obtain first metadata describing a first three-dimensional (3D) shape associated with the audio object. The apparatus is further adapted to transform the obtained first metadata to produce transformed metadata describing a two-dimensional (2D) plane or a one-dimensional (1D) line. The 2D plane or the 1D line represent at least a portion of the audio object. In one embodiment, the apparatus comprises processing circuitry and a storage unit storing instructions for configuring the apparatus to perform any of the processes disclosed herein.

Compared to existing methods of rendering an audio object, the embodiments described herein provide a more efficient method of representing both the width and the height of an audio object dynamically as the listener moves around in a six degree of freedom (6DoF) XR scene.

BRIEF DESCRIPTION OF THE DRAWINGS

The accompanying drawings, which are incorporated herein and form part of the specification, illustrate various embodiments.

DETAILED DESCRIPTION

Figure 1:
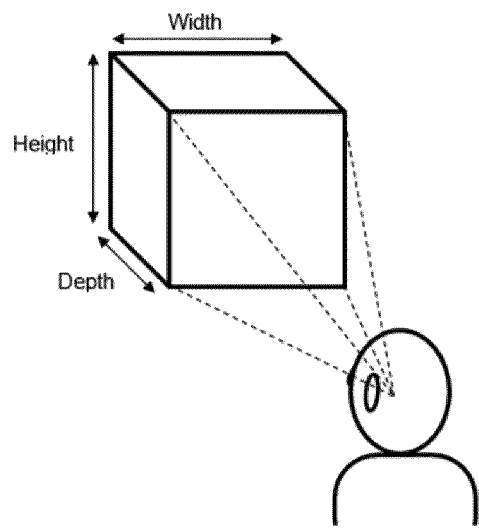
FIG. 1 is exemplary representations of an audio object.
Figure 1:
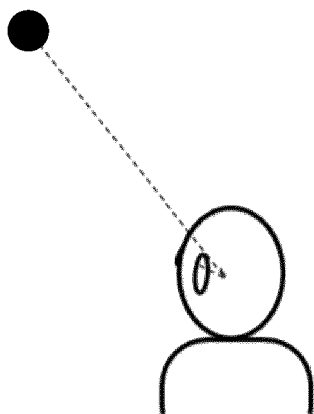

In order to render an audio object with a complex extent (i.e., complex shape) in a 6DoF virtual environment, the shape of the object needs to be evaluated in real-time as the listening position of the listener changes. The shape of the object in relation to the listening position of the listener should influence the apparent position, width, and height of the audio object in order to match the behavior of a real sound source.

The level of detail of the extent that needs to be considered when rendering the audio of the audio object without affecting the perceived spatial quality will vary depending on, for example, the distance to the audio object from the listener's position. When the listener is moving further away from the audio object, the details of the shape will have less importance. This can be exploited by an efficient implementation by gradually simplifying the shape description of the extent.

Typically, the extent of volumetric audio objects is either described by a basic shape (e.g. a sphere or a box) or a more elaborate description based on, for example, combinations of basic shapes, mesh structures, or other forms of shape descriptions. In order to efficiently render in real-time these audio objects that have a complex shape description it is desirable to simplify the description of the object's shape in a way that preserves the important cues that are perceived by the auditory system but requires less complexity. In many cases such a simplification is possible because very fine shape details are typically not perceptually relevant for the audio rendering, so it would be a waste of computational resources to take these fine shape details into account in the rendering process.

This disclosure describes a method for simplifying the complex description of the audio object so that a plausible impression of the audio object can be rendered to the listener at a low computational cost.

In one embodiment, the method is divided into three basic steps:

(1) An optional pre-processing step that simplifies the complex description of the extent (i.e., shape) of the audio object into a simpler description. For example, the simpler description could be: a mesh structure with fewer vertices, a basic shape (e.g., a box, sphere, ellipsoid or cylinder), or a combination of several basic shapes. This simplified shape description may be used instead of the original one, either all the time or only, for example, when the distance to the listening position of the listener is long enough. This step is described in section 1.

(2) A real-time simplification step where the extent is represented with a 2-dimensional plane or a 1-dimensional line. Here the momentary listening position of the listener is taken into account. This step is described in section 2.

1(3) Rendering of the audio object given its simplified geometrical extent as determined in step 2. In the rendering stage processing may be added to add perceptual effects such as distance gain etc. This step is described in section 3.

1. Pre-Rendering Simplification

The pre-rendering simplification step is done before the rendering is started, or alternatively, as a parallel process while the rendering is running but where its results are not used until the step has completed. The aim of this step is to find one or several simplified descriptions of the extent that can be used depending on the amount of details that is needed at a particular moment. Several alternative extent descriptions may be stored in a list so that the real-time rendering step can select the most appropriate extent description at every time instant. Since the pre-rendering simplification step is not done in real-time, it may involve complex calculations and optimizations if needed. This step may even be done as part of the content creation step, where several alternative representations are pre-calculated. Alternatively, an encoding node or pre-rendering node may do this step, in order to off-load the listener's device.

The amount of details in the description of the extent that are needed to make a good quality rendering for the listener in the extended reality scene depends on many things that may vary in real-time, for example: i) the distance of the audio object to the listening position of the listener in the extended reality scene; ii) the size of the audio object; iii) how many other audio objects that are currently active; iv) the current audio energy level of the audio object; v) the current CPU load of a renderer that will be used to render the audio object.

If the distance is large enough, any audio object can be well enough represented with a simple point-source. But the closer the listener is to the audio object the more details are needed in order to provide a subjectively accurate audio rendering of the audio object.

By pre-determining one or several simplified descriptions of the extent, the description that provides the most efficient trade-off of details contra complexity can be chosen at any time. As an example, a complex mesh structure describing the extent of an audio object can be simplified into two alternative simplified shapes, where one is still a mesh structure but with a reduced number of vertices and the second one is just a box shape with the dimensions set to match the original shape. An example of such simplifications is shown in FIG. 2, which shows a complex mesh structure 202, a first less complex version 204 of the complex mesh structure 202, and a second less complex version 206 of the complex mesh structure 202.

Figure 2:
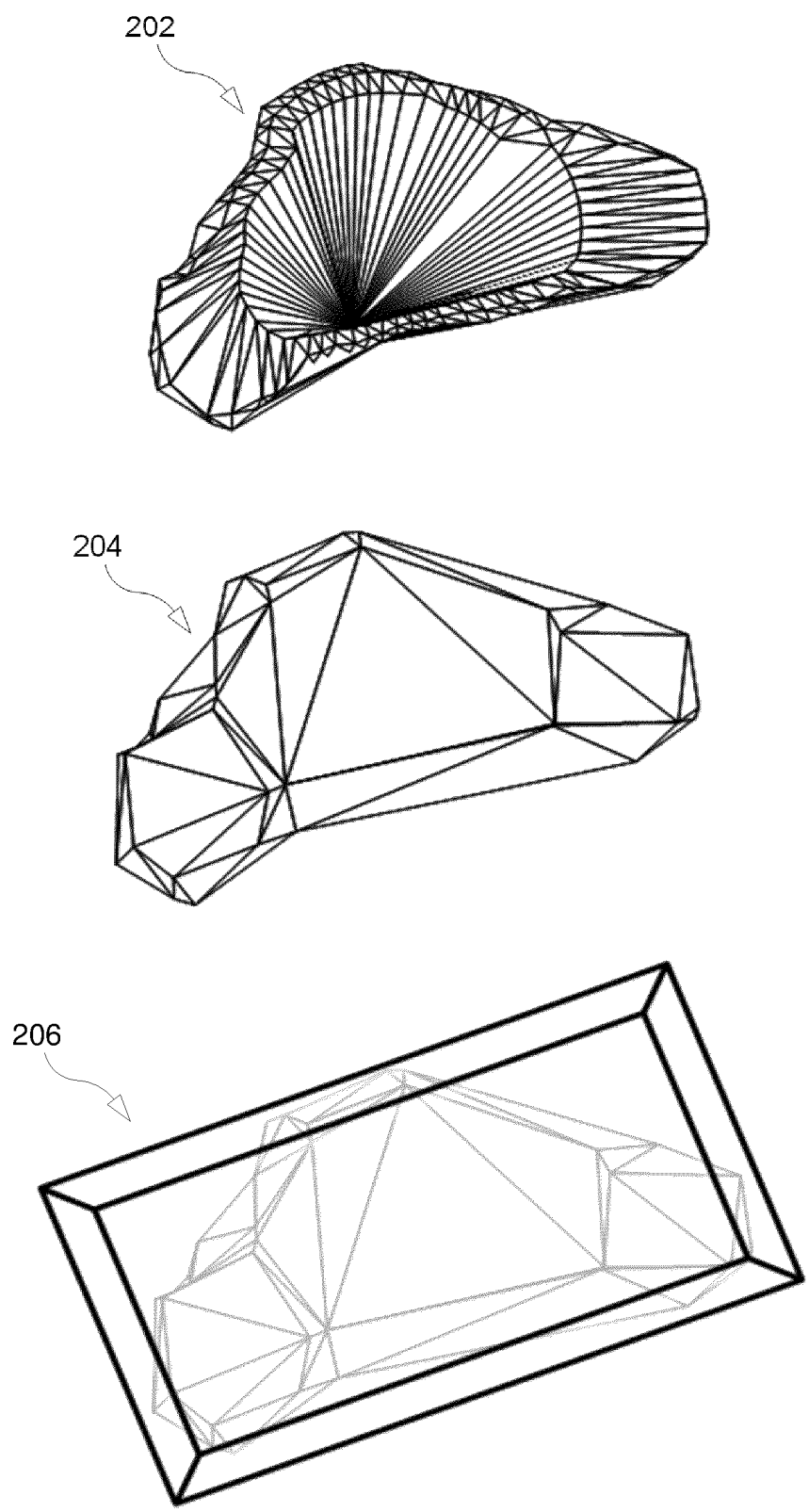
FIG. 2 shows examples of simplified extent.

As shown in FIG. 2, mesh structure 202 has a relatively high number of vertices. In the example shown, mesh structure 202 represent a forest as seen from above. In this example, the first less complex version 204 of the complex mesh structure 202 is itself a mesh structure but mesh structure 204 has less vertices than mesh structure 202; and the second less complex version 206 of the complex mesh structure 202 is a simple box shape that is used to represent the shape of the forest. That is, in the example of FIG. 2, two simplified shapes are created, one by reducing the number of vertices of the original mesh structure 202 and one based on a basic box shape 206. The two alternative shape descriptions 204 and 206 represent different levels of simplification and depending on the required amount of details, either of these representations can be selected as basis for the real-time simplification step. With respect to box shape 206, the box shape has been rotated so that one dimension is representing the largest dimension of the forest (i.e. mesh structure 202) and the width and height of the box is adjusted so that it matches mesh structure 202 as closely as possible. Even simple shapes, such as spheres or boxes, can be simplified into a point-source when the distance to the listener is far enough.

Many methods for reducing the number of vertices in a mesh are known (see, e.g., reference [8]). The problem of decomposing an arbitrary shape into one or a few basic shapes, such as boxes, is also a well-known problem that can be solved, for example, by using minimum-volume bounding box decomposition (see reference [9]). As described herein, a number of alternative representations are pre-calculated along with a parameterized way of selecting which representation to use at any time during the real-time rendering.

The parameterized selection of which of these representations to use as basis for the real-time simplification, step 2, can be based on the distance of the audio object from the listening position of the listener. An example of this is described in Table 1.

TABLE 1

Table for use in choosing between representations of a complex extent

| Used representation | Distance | Comment |
| --- | --- | --- |
| Mesh structure | 0-$D_1$ | The mesh structure can describe the shape of an audio object as accurate as needed when the listener of the audio object is close to the audio object. |
| Box shape | $D_1$-$D_2$ | As the listener moves away from the audio object, the exact shape |

TABLE 1-continued

Table for use in choosing between representations of a complex extent

| Used representation | Distance | Comment |
| --- | --- | --- |
| | | of the audio object becomes less important and it is enough to describe the audio object with a basic shape of the same size. |
| Single point | $D_2$-$\infty$ | When the listener is far enough from the audio object, sound from the audio object can be represented with a point-source. |

Here $D_1$ and $D_2$ are threshold distance parameters that can either be constants or variables and are controlled by, for example, the number of currently active audio objects or current CPU load. The design parameters may depend on the size of an audio object. For example, the listening position of the listener may need to be further away from a large audio object for a single point representation of the large audio object to be adequate. In the example shown in Table 1, there are three different representations for the audio object and two parameters (i.e., D1 and D2) are used to indicate to a renderer when to switch between the three different representations. Any extra representation, such as the simplified mesh structure 204 representation in FIG. 2, would require an extra parameter specifying when such representation should be used.

Following is an example of how $D_1$ and $D_2$ can be selected: $D_1=2S_{max}$ and $D2=20S_{max}$, where $S_{max}$ is the size of the extent in its largest dimension (e.g., length, width, height or depth).

In some cases (e.g., when the computational resources available for rendering are below a certain lower limit), $D_1$ may be very small or even 0 (i.e., the original mesh is always simplified to at least the first level of simplification—the box shape in the case of Table 1).

2. Real-Time Simplification Step

The real-time simplification step may be run as a part of a rendering process when the current listening position of the listener is known. This step may typically be run at an even rate related to the frame size used by the rest of the renderer (e.g., this step may be performed each time a new audio frame is received or processed). Alternatively, this step may be triggered only when there is a change in position or rotation of either the audio object or the listener.

Because the step is performed in real-time, one of the different representations determined in step 1 may be selected according to the parametrized selection rule and the current listening position of the listener. Other parameters that may be taken into account in the selection of one of the representations are the number of active audio objects, CPU load of the renderer, current audio energy level of the rendered audio object, etc.

After one of the representations (i.e., the original or one of the simplified descriptions) is selected, the selected representation may further be simplified into a 2-dimensional (2D) plane or a 1-dimensional (1D) line. In this further simplification, the depth of the audio object is not considered because the depth of the audio object placed in front of the listener of the audio object is not subjectively perceivable in the same way as the width and the height of the audio object.

When an audio object is positioned straight ahead of the listener, the perceptual horizontal width as perceived by the listener is determined primarily by time and level difference cues. The perceived vertical height of the object is however determined primarily by less accurate spectral cues.

Thus, the listener is typically able to estimate the horizontal width of an audio object more accurately than its vertical height. Perceptual estimation of the depth of an audio object is even less accurate, and is usually simply not possible. So, the depth dimension of the audio object typically does not need to be included in the rendering of the audio object.

Accordingly, a 2D plane representing both the width and height of an audio object captures most of the important spatial cues. And in many cases a 1D line representation of only the position and horizontal width of an audio object will be an efficient representation that captures the most important spatial cues of the original audio object.

This simplification step is simplifying the geometrical shape of the extent, but this might not necessarily correspond directly to the perceived width and height that the listener experiences. These perceptual effects should be handled by the rendering step, where the perceived width and height are calculated from the geometrical size and shape of the extent.

2.1 Finding the Description Points

The process of finding the 2-dimensional plane to represent an audio object starts with finding an anchor point on, within or close to the extent, as well as the outer edges of the extent, as seen from the listening position of the listener. Accordingly, the following steps may be performed:

(1) Find an anchor point on, within, or close to, the extent. The 2-dimensional plane that will be defined in the steps below will be fitted such that it goes through the anchor point. The line between the listening position of the listener and this point will serve as the reference direction from which angles of the following points are computed from.

(2) Find the point of the extent that represents the right edge of the extent from the listening position of the listener. This corresponds to the point with the highest azimuth angle relative to the reference direction.

(3) Find the point of the extent that represents the left edge of the extent from the listening position of the listener. This corresponds to the point with the lowest azimuth angle as relative to the reference direction.

(4) Find the point of the extent that represents the top edge of the extent from the listening position of the listener. This corresponds to the point with the highest elevation angle as relative to the reference direction.

(5) Find the point of the extent that represents the bottom edge of the extent from the listening position of the listener. This corresponds to the point with the lowest elevation angle as relative to the reference direction.

Figure 3A:
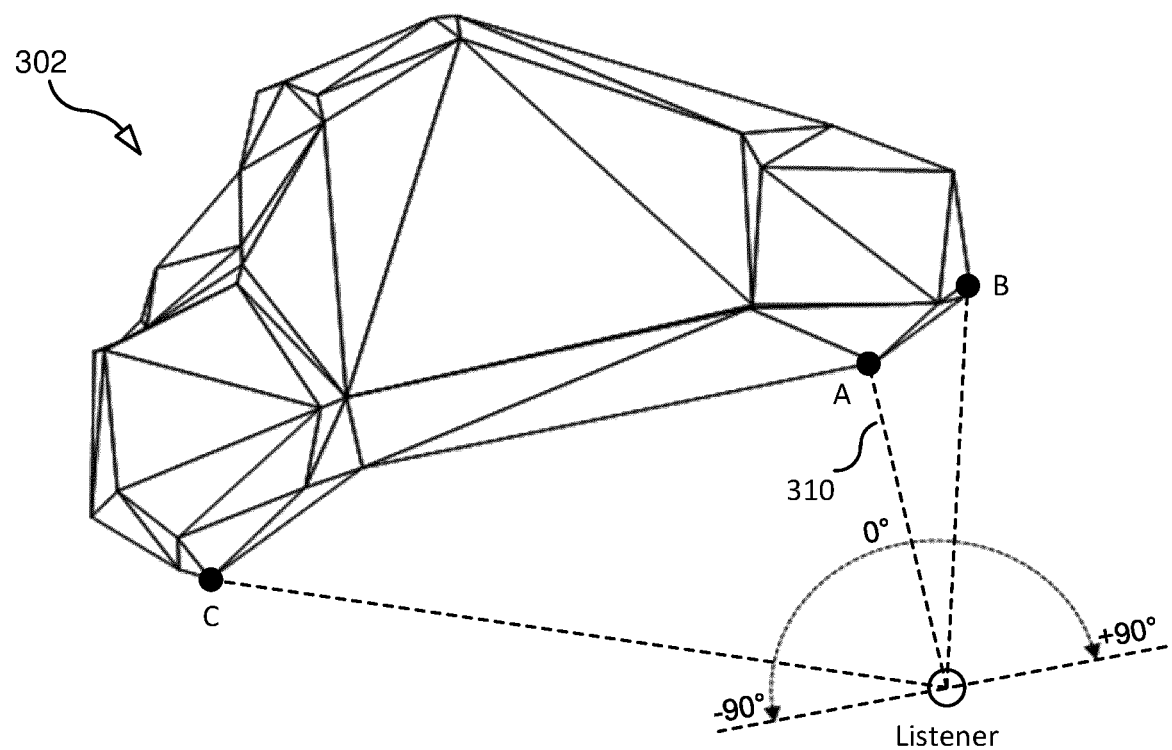
FIG. 3A and FIG. 3B show exemplary processes of finding the description points.

The five points that are found during this process will be denoted as the description points of the representation of the extent. FIG. 3A shows an example of the process of finding the description points. That is, FIG. 3A shows how the description points are found for a mesh-based extent 302. For the sake of simplicity, FIG. 3A is shown from a bird's-eye view, which means that the elevation axis is not shown. The line 310 between the listening position of the listener and the anchor point (A) on the extent 302 is used as the basis for the angle measurements, where azimuth is 0 in the direction of the anchor point and increases to the right and decreases below zero to the left. The right edge (B) and the left edge (C) are then found as the points on the extent that has the maximum respective minimum azimuth angle. The top and bottom edges are the points that have the maximum respective minimum elevation angles.

2.1.1 Finding the Anchor Point

The anchor point is the point that will serve as the base point for the resulting 2-dimensional plane or 1-dimensional line. The plane or line will be defined so they cross through this point so the anchor point will to a large degree define the distance and angle to the listener. Different methods to find an anchor point are described below.

2.1.1.1 Using the Closest Point as the Anchor Point

A straight-forward method to find the anchor point is to use the point on the extent that is closest to the listening position of the listener. The exact method to find the closest points on the extent will vary depending on the type of representation used, e.g. a basic cylinder shape doesn't have any vertices so the closest point on its surface needs to be found using a parametric model based on its radius, length, position and rotation. A box shape has vertices, but the closest point may be somewhere on one of its surfaces and not exactly on one of the vertices. For some shapes, the closest point is easy to calculate, such as for a sphere, whereas for other shapes an approximation may be necessary where it would be a too complex process to identify the exact closest point.

For a complex mesh shape, a limited number of points may be evaluated, representing both vertices and points on the surfaces. Each of these points are then evaluated to identify which one is the closest by calculating its Euclidian distance, D, to the listening position: $D=|P_k-P_L|$ where $P_k$ is the 3-dimensional position of point k on the extent and $P_L$ is the listening position of the listener.

2.1.1.2 Alternative for Determining the Anchor Point

As an alternative to using the closest point as the anchor point, a spatial average of points on (or in some embodiments within) the extent can be used to select the anchor point.

In one specific embodiment, the anchor point is found by determining the geometric "centroid" of the part of the extent that is "visible" from the listening position of the listener.

The "visible" part of the extent may be defined by the largest contour on the object's extent surface that has a direct line of sight from the current listening position of the listener. For example, for a spherical extent, the contour would be a circle with the same radius as the sphere, and the "visible" part of the extent would be the frontal hemisphere of the spherical extent with respect to the listening position of the listener.

For a cubic extent with length L where one of the vertical edges of the cube faces the listener the contour would be a rectangle sized *L-by-L, and the visible part of the extent would be the half of the cubic surface that is facing the listener. For more arbitrarily shaped extents the contour may have an arbitrary shape also, and the visible part of the extent surface will in general not simply be half of the total surface of the extent.

Once the "visible" part is determined, the anchor point can be found by finding the geometric centroid of the visible part (e.g. by spatially averaging the position vectors of all points on the visible part of the extent). In the example of a spherical extent, the anchor point would thus be located at a point inside the extent on the line between the listening position of the listener and the center of the extent, somewhere between the surface and the center of the spherical extent. Hence, in this example, the anchor point is located on the same line from the listener as the closest point that was used in the first embodiment, but at a somewhat larger distance from the listener. For an arbitrarily shaped extent this will usually not be the case—i.e., for an arbitrarily shaped extent the anchor point derived as described above and the closest point will, in general, not be located on the same line from the listening position of the listener.

Figure 3B:
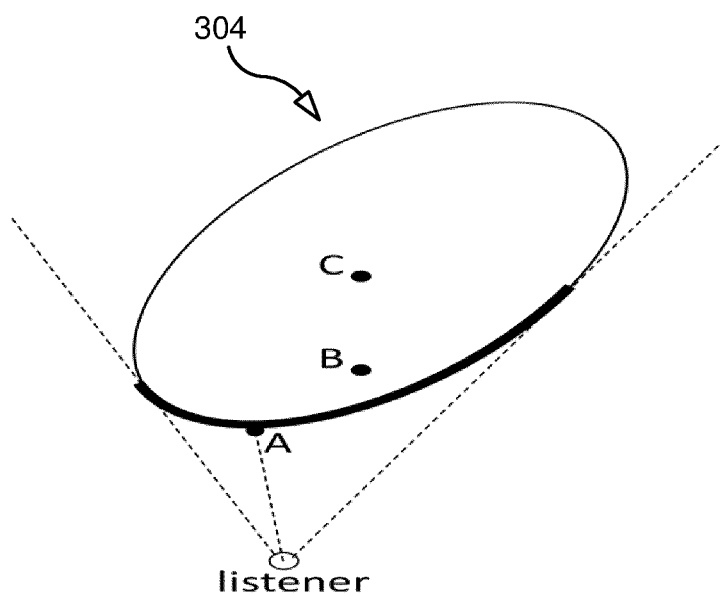

FIG. 3B shows, for the example of an elliptical extent 304, the difference between using the closest point (A) on the extent, and the geometric centroid (B) of the visible part of the extent as anchor point. Note that the visible part of the extent is indicated in the figure by the thick line segment.

In cases where the extent is defined in a discrete way (e.g. through a set of mesh vertices) and where the distribution of points is non-uniform (as seen from the listening position of the listener), this non-uniformity of spatial sampling of the extent surface may be accounted for by appropriate weighting of the position vectors in the spatial averaging procedure that is used for determining the anchor point.

In other alternative embodiments, the anchor point may be determined as the geometric centroid of the full spatial extent, as opposed to only the "visible" part of the extent. This will result in an anchor point that is located at the spatial centroid of the volume enclosed by the extent. In the simple example of the spherical extent it would be located at the center of the sphere. FIG. 3B also shows this alternative anchor point (C) for the example elliptical extent. This alternative embodiment may be suitable for smaller volumetric sound sources, whereas the embodiment that uses the "visible" part of the extent may be more suitable for large volumetric sound sources.

In yet another alternative embodiment, the anchor point is determined as the geometric centroid of some limited area of the extent around the closest point as determined according to the method described in section 2.1.1.1.

An advantage of the alternative embodiments described in this section is that the position of the anchor point varies more smoothly with changes in the listening position of the listener and/or object position/orientation than when the closest point is used as anchor point, especially with irregularly shaped extents. As a result, also the position and orientation of the fitted 2-dimensional plane varies more smoothly with changes in listener position and/or object position/orientation. In particular, these alternative embodiments do not exhibit the issue where the fitted 2D plane changes abruptly due to discontinuous jumps of the anchor point, as will be discussed in more detail below. This advantage comes at the cost of the somewhat more complex calculation of the position of the anchor point, although on the other hand the embodiment may not require the smoothing processing described below in section 2.3.

2.1.2 Find the Description Points Given an Anchor Point

Given an anchor point, numerous methodologies can be used to determine the other description points, one of which, for an example, is described below using a mesh shape as an example.

The right and left edges of the extent may be found by evaluating the azimuth angle, φ, of the vector between the listening position and the evaluated point relative to the vector between the listening position and the anchor point of the extent: azimuth angle $$\varphi_k = a\cos\left(\frac{v_k \cdot v_c}{\|v_k\| \|v_c\|}\right),$$

where $v_k$ is the vector between the listening position and point k on the extent and $v_c$ is the vector between the listening position of the listener and the anchor point of the extent, both vectors with the elevation component set to zero. In this example, as depicted in FIG. 3A, the azimuth angle is defined to be zero in the direction of the anchor point, increases to the right and decreases to the left.

Similarly, the top and bottom edges are found by evaluating the elevation angle of the vector from the listening position and the evaluated point relative to the horizontal plane of the scene. The elevation angle, $\theta_k$, of a point on the extent $v_k$ with the coordinates (x, y, z) relative to the listening position can be calculated as: elevation angle, $$\theta_k = a\cos\left(\frac{z}{\|v_k\|}\right),$$

where the coordinate system is defined such that the z-component represents the upwards direction in the scene.

2.2 Defining the 2-Dimensional Plane or 1-Dimensional Line Representation

Figure 4:
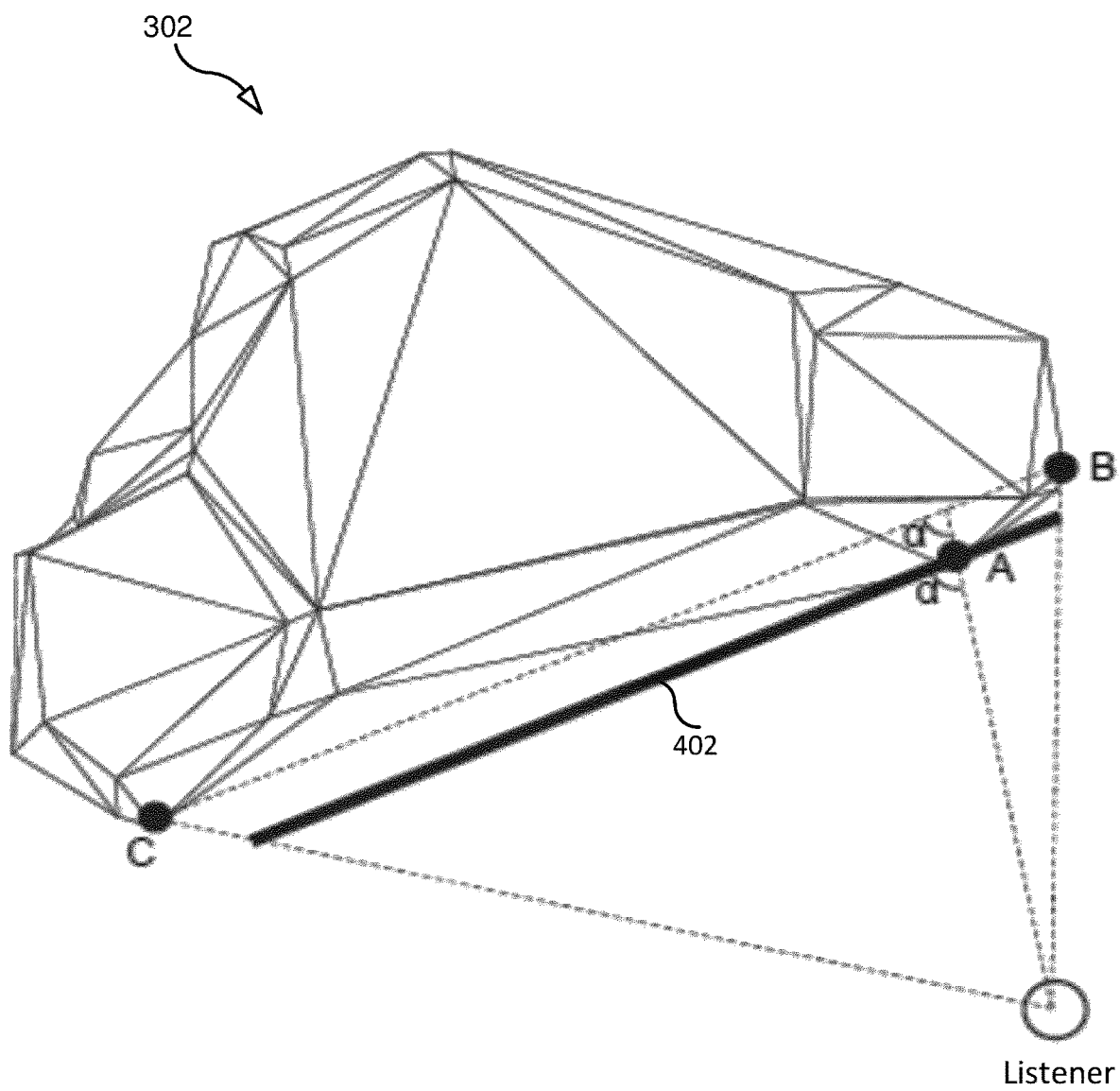
FIG. 4 illustrates an exemplary process of defining a 2D plane.

After determining the description points, the next step may comprise defining the 2-dimensional plane. FIG. 4 shows an example of the process. For the sake of simplicity, FIG. 4 is shown from a bird's-eye view, which means that the elevation axis is not shown. As shown in FIG. 4, a plane 402 is defined so that it crosses through the anchor point (A) of the extent 302 at a horizontal angle, a, that matches the angle between the line from the listening position of the listener to the anchor point, and the line from the right edge (B) to the left edge (C) of the extent. The outer edges of the plane should align with the lowest and highest azimuth of the respective outer edges of the extent. The same approach is used when calculating the height and vertical tilt of the plane, using the top and bottom description points as basis.

In another embodiment, a simplified 1-dimensional representation is used, where the height aspect of the plane is neglected and the representation is a line passing through the anchor point (A) at a horizontal angle, a, that matches the angle between the line from the listening position of the listener to the anchor point, and the line from the right edge (B) to the left edge (C) of the extent. The ends of the line should align with the lowest and highest azimuth of the respective outer edges of the extent. With this simplified representation the top and bottom edge description points are not needed.

In the case that the extent representation selected from the simplified representations derived in the pre-rendering simplification step is a point-source, the calculation of the 2-dimensional plane or 1-dimensional line representation can be bypassed.

Alternatively, the 2-dimensional plane may be fitted as passing through the anchor point and being oriented perpendicular to the line from the listening position of the listener to the anchor point. In this case, the edge points as described above are still used to determine the "opening angle" of the extent and its 2-dimensional planar representation (as seen from the listening position of the listener), but the orientation of the 2D plane is always perpendicular to the line from the listener to the anchor point. This representation may be preferable for some extent shapes.

2.3 Movement Synchronized Smoothing of the Extent Description

One potentially important aspect of the real-time simplification is that the changes of the position and extent may need to be smooth so that the listener doesn't experience unexpected abrupt changes in the spatial representation of the audio object.

As the listener or the audio object moves around or rotates, the description points of the extent representation will sometimes jump from one point to another. This may also happen when switching between different representations as defined in the pre-rendering simplification step. Any such sudden jumps need to be smoothed out in order to not generate unnatural audio artifacts. But normal temporal smoothing is not suitable here since it could make audio objects appear to move even when they are not.

A better approach is to use smoothing that is synchronized to the relative movement of the listener and the audio object. This means that the changes of the extent description are only updated if either the listener moves, or the audio object moves or rotates. This would avoid situations where an audio object's extent is changing while the listener is still or the case where a very small listener movement results in a big change in audio object's position or shape, which could happen with temporal smoothing.

Figure 5:
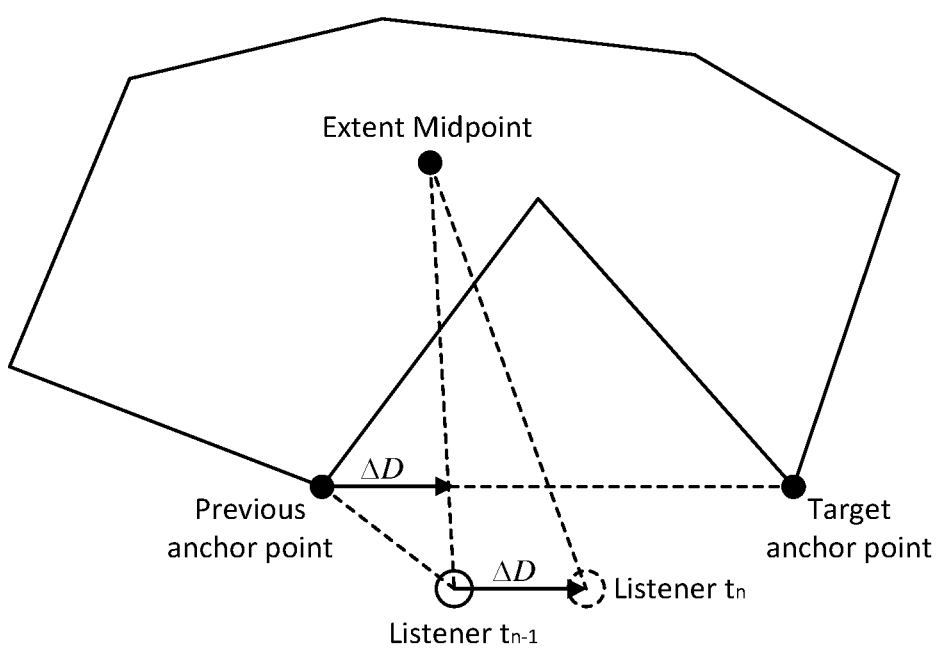
FIG. 5 illustrate a scenario where a very small movement of the listener triggers a jump in position of the anchor point

FIG. 5 shows an example of a case where a very small movement of the listener will trigger a jump in position of the anchor point. By measuring the change of the relative distance between the listener and the center position of the audio object, the change of the description points can be made synchronized with this change. This is done by applying a limit on the change of the description points so that they will never move more than the relative distance changes. In the example of FIG. 5, the closest point is used as the anchor point. As the listener moves from position at $t_{n-1}$ to $t_n$ the closest point of the extent makes an abrupt jump from one edge to another (i.e. from "previous anchor point" to "target anchor point"). In this case, a very small change of the listening position would make a big difference in position of the extent, which would be experienced as unnatural. Even using temporal smoothing techniques, this problem would be not be solved. By basing the smoothing on the change of the relative distance between the listener and the audio object, $dD_R$, a more natural behavior can be achieved. In this example, only the listener is moving so the change of relative position is the same as the change of the listener's position. The smoothing will make the anchor point move in the direction towards the target position, but only a distance that is limited by the change in relative distance, $dD_R$.

A rotation of the listener will not affect the extent description, but a rotation of the audio object may do so. Thus, the rotation of the audio object should also be taken into account when limiting the changes of the extent description.

A specific example of smoothing proportional to the change of relative position will now be described. Let $D_R$ denote the relative distance between the audio object and the listening position of the listener and $dD_R$ the delta change of the relative distance. $dD_R$ is the calculated as: $dD_R=|(p_{AEn}-p_{Ln})|-|(p_{AEn-1}-p_{Ln-1})|$, where $p_{AEn}$ and $p_{Ln}$, are the 3-dimensional positions of the audio object and listener at time instant n and $p_{AEn-1}$ and $p_{Ln-1}$ are the corresponding positions from the last time instant.

The five different description points of the extent representation should all be interpolated/smoothed such that maximum change of position of each point is limited to $dD_R$. This can be done by first calculating the delta change of each point as: $dD_{vSmooth}=\min(dD_v, adD_R)$, where $dD_v$ denotes the distance between the old position of the description point and the new target point, $dD_{vSmooth}$ denotes the smoothed distance that the description point is updated with and a is a design constant that controls the relation between the update speed and $dD_R$. In most cases a value between 1.0-2.0 is preferable.

Then the description point is updated as $$p_{Pn} = p_{Pn-1} + dD_{vSmooth}\frac{p_{pn}-p_{pn-1}}{|p_{pn}-p_{pn-1}|},$$

where $p_p n$ is the target description point and $p_{pn-1}$ is the previous description point. Thus, the change of the description point is done in the direction of the new target description point, but the distance is limited to be at maximum as large as the change of the relative position between the listener and the audio object. See FIG. 5 for an example.

In order to include the rotation of the audio object as part of the smoothing, an extra term can be added into the calculation of $dD_R$, where the rotation is calculated as a circular movement around the midpoint of the extent at the radius of the anchor point. $dD_R$ is then calculated as: $dD_R=|(p_{AE1}-p_{L1})|-|(p_{AE1}-p_{L1})|=|d\theta r|$, where $d\theta$ is the change in rotation since last iteration of the method and r is the distance from the center point of the extent to the anchor point to the listening position of the listener. In order to capture rotation in all directions, $d\theta$ can be calculated as the sum of the rotation around all axis.

3. Rendering

The two previously described steps have been done to simplify the 3-dimensional geometrical shape of the audio object into a 2-dimensional plane or 1-dimensional line. The rendering step uses this simplified description of the geometrical shape and uses spatial rendering techniques to render the audio object to the listener. That is, the rendering step uses the simplified description together with a spatial rendering technique to render an audio signal (e.g. a multi-channel audio signal) that represents the audio object. Different spatial rendering techniques can be used depending on what speaker configuration is used, e.g. binaural rendering is typically used for headphones whereas speaker panning techniques are typically used for other speaker setups. In some cases, the rendering is done in an intermediate format, such as Ambisonics or some specific multi-channel audio format.

In order to convey spatial information from a multi-channel audio object, the different channels should be rendered so that they represent the intended dimensions of the object. For a stereo audio object, the two channels typically represent the spatial information in the horizontal plane and therefore should be rendered as the left and right side of the object. This can be done by using two sources that represent respectively the right and the left sides of the simplified extent. In the simplest embodiment these could be point sources, but in a more advanced implementation these sources can use head related transfer functions (HRTFs) that better describe the extent of the 2-dimensional plane. With a multi-channel source including channels that describe the spatial information also in the elevation dimension, more sources are needed to represent also the elevation dimension.

Figure 6A:
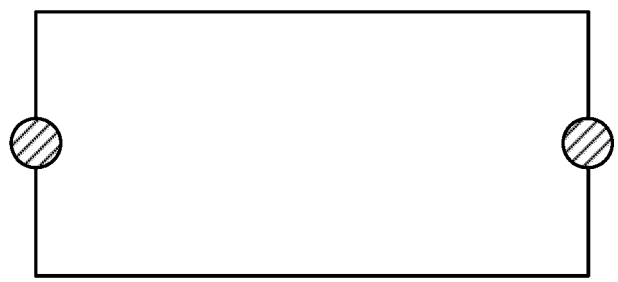
FIGS. 6A-6C shows examples of rendering configurations.
Figure 6B:
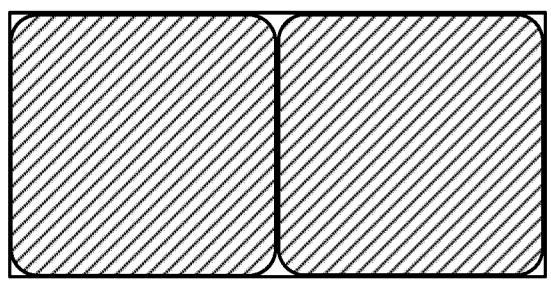
Figure 6C:
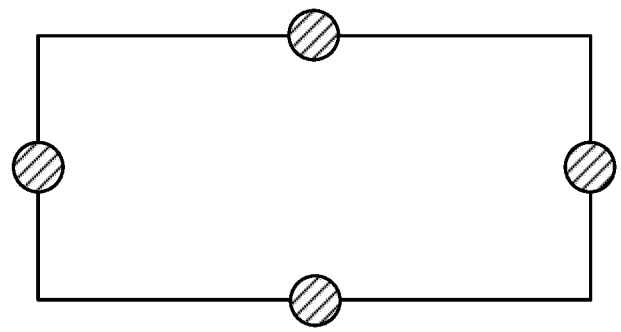

Examples of rendering configurations as described above are shown in FIG. 6A, FIG. 6B, and FIG. 6C. In these figures, three different ways of rendering an audio object represented by a 2-dimensional plane using multiple virtual sound sources are shown. In the example of FIG. 6A, two point sources are used to render an audio object with a stereo audio signal. In the example of FIG. 6B, two virtual sound sources with associated HRTFs that represent sub-areas of the 2-dimensional plane are used to render an audio object with a stereo audio signal. Specifically, FIG. 6B shows how the 2-dimensional plane may be divided into segments that together cover the entire 2-dimensional plane, and each segment may then be rendered through a virtual sound source with an associated HRTF that is representative for that whole segment. In the example of FIG. 6C, four virtual point sources are used to render an audio object with a four-channel audio signal, where the different channels are representing the spatial information in both the horizontal and vertical plane.

Figure 7:
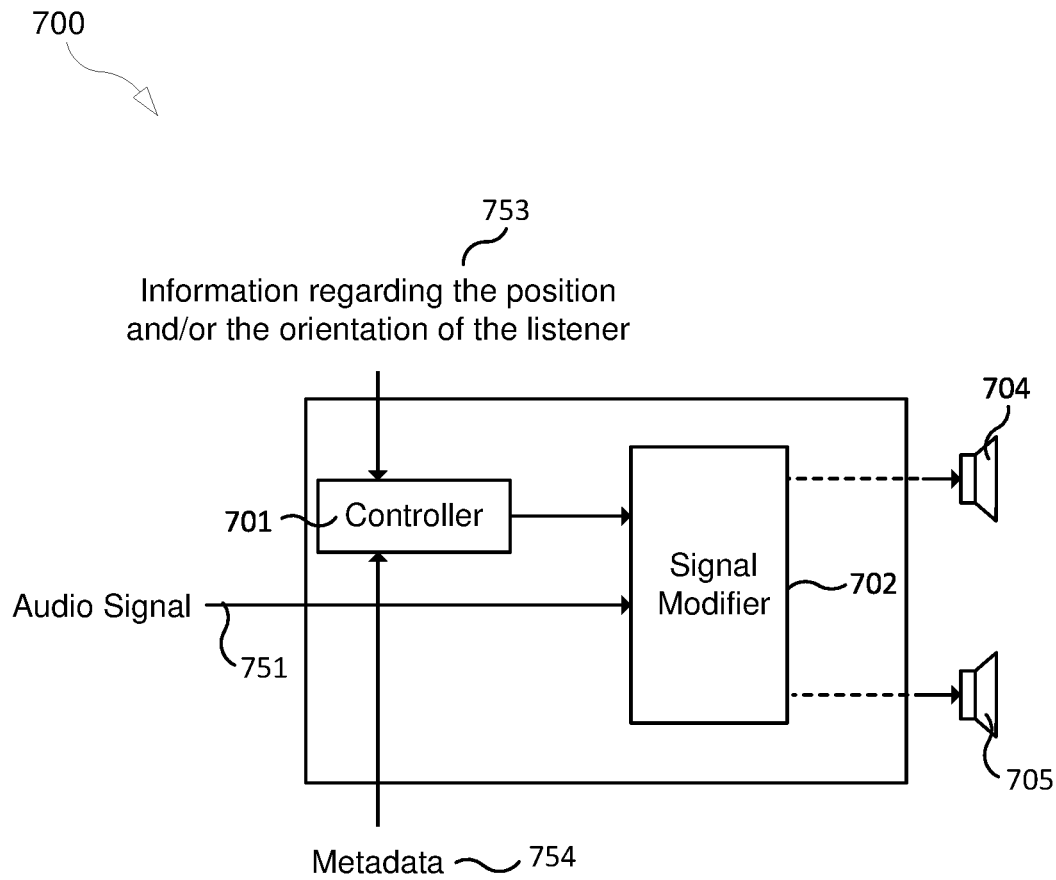
FIG. 7 shows a system according to some embodiments.

Extra processing of the virtual sound sources' signals before the binaural rendering may also be needed in order to achieve a perceptually correct spatial distribution over the plane, using e.g. Mid/Side mixing techniques. If the shape is relatively long in one dimension it might be rendered as a line-source where the special behavior of a line-source can be taken into account 4. Example Implementation FIG. 7 shows an example system 700 (a.k.a., renderer) for producing sound for a XR scene. System 700 includes a controller 701, a signal modifier 702 for modifying an audio signal 751 (e.g., a multi-channel audio signal), a left speaker 704, and a right speaker 705. While one audio signal and two speakers are shown in FIG. 7, this is for illustration purpose only and does not limit the embodiments of the present disclosure in any way.

Controller 701 may be configured to receive one or more parameters and to trigger modifier 702 to perform modifications on audio signal 751 based on the received parameters (e.g., increasing or decreasing the volume level). The received parameters include (1) information 753 regarding the position of the listener (e.g., direction and distance to an audio source) and (2) metadata 754 regarding an audio object, such as, for example, the transformed metadata describing the 2D plane or 1D line as described herein (in some embodiments, controller 701 itself produces the metadata 754).

Figure 8A:
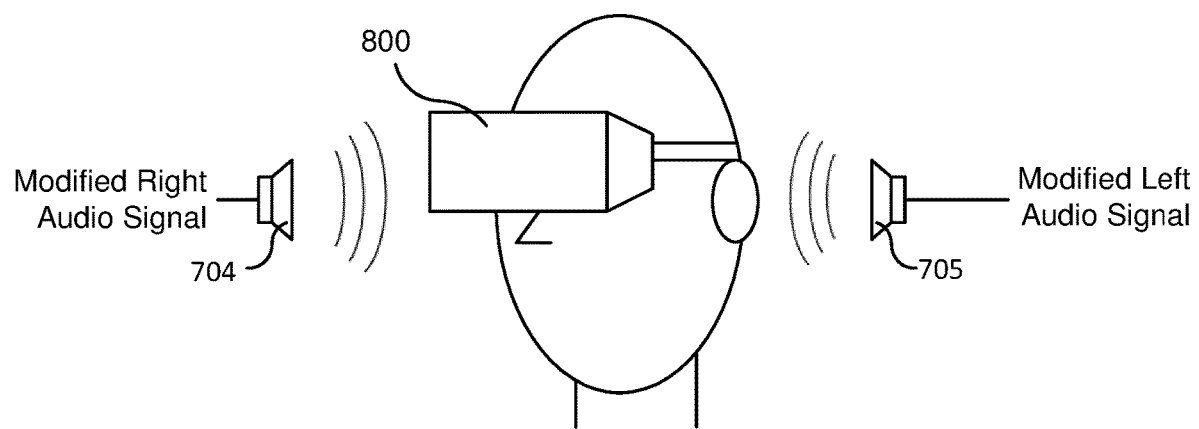
FIGS. 8A and 8B show a system according to some embodiments.
Figure 8B:
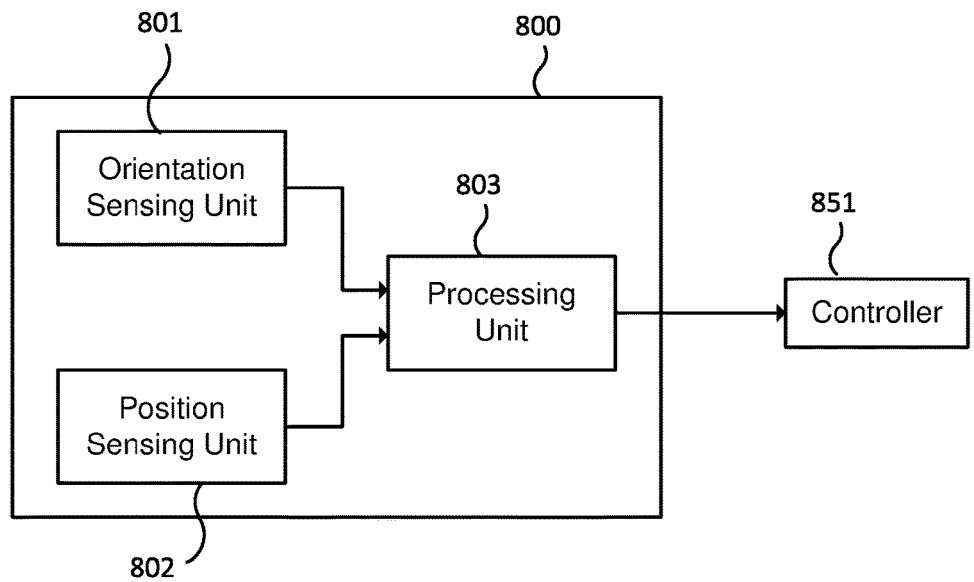

In some embodiments of this disclosure, information 753 may be provided from one or more sensors included in an XR system 800 illustrated in FIG. 8A. As shown in FIG. 8A, XR system 800 is configured to be worn by the listener. As shown in FIG. 8B, XR system 800 may comprise an orientation sensing unit 801, a position sensing unit 802, and a processing unit 803 coupled to controller 851 of system 800. Orientation sensing unit 801 is configured to detect a change in the orientation of the listener and provides information regarding the detected change to processing unit 803. In some embodiments, processing unit 803 determines the absolute orientation (in relation to some coordinate system) given the detected change in orientation detected by orientation sensing unit 801. There could also be different systems for determination of orientation and position, e.g. a system using lighthouse trackers (lidar). In one embodiment, orientation sensing unit 801 may determine the absolute orientation (in relation to some coordinate system) given the detected change in orientation. In this case the processing unit 803 may simply multiplex the absolute orientation data from orientation sensing unit 801 and the absolute positional data from position sensing unit 802. In some embodiments, orientation sensing unit 801 may comprise one or more accelerometers and/or one or more gyroscopes.

Figure 9:
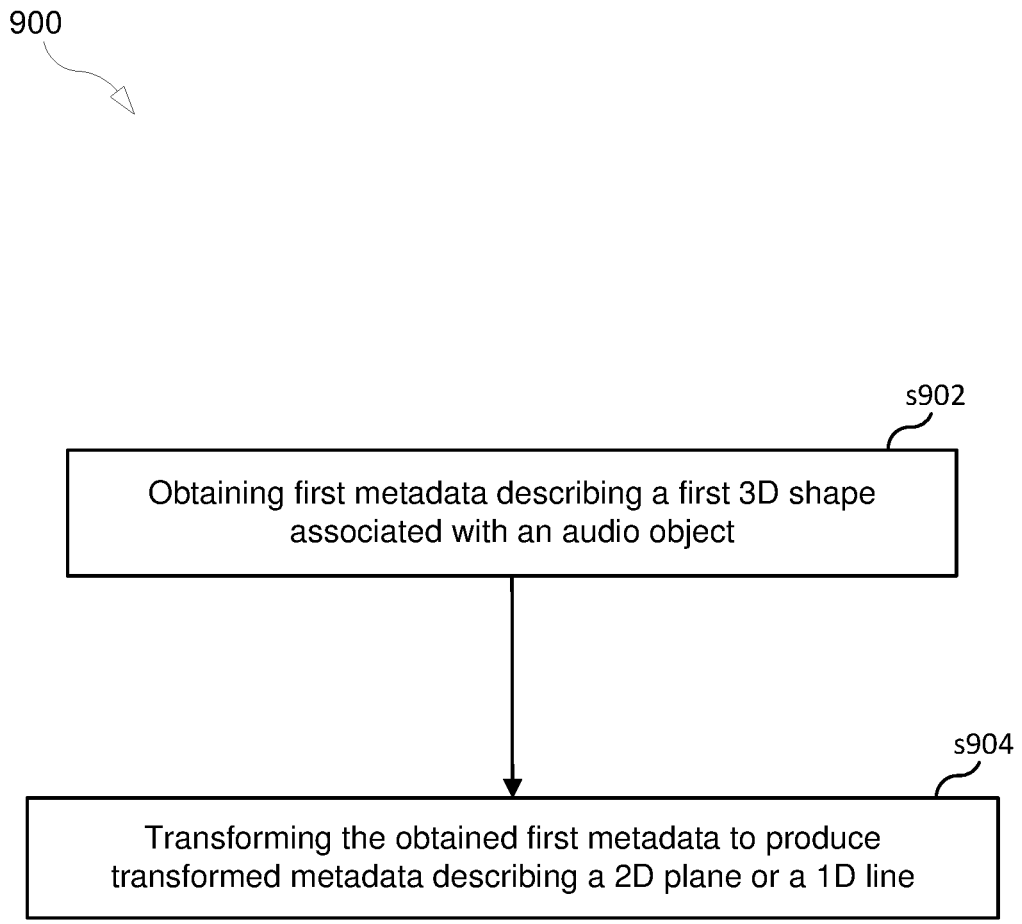
FIG. 9 is a process according to some embodiments.

FIG. 9 is a flow chart illustrating a process 900 for representing an audio object in an extended reality scene. The process 900 may begin with step s902.

Step s902 comprises obtaining first metadata describing a first three-dimensional (3D) shape associated with the audio object.

Step s904 comprises transforming the obtained first metadata to produce transformed metadata describing a two-dimensional (2D) plane or a one-dimensional (1D) line. The 2D plane or the 1D line represent at least a portion of the audio object.

In some embodiments, obtaining the first metadata comprises selecting the first metadata from a set of metadata comprising the first metadata and second metadata that describes a second 3D shape associated with the audio object and the second 3D shape described by the second metadata is in the form of one of the following: a mesh structure with fewer vertices than the first 3D shape described by the first metadata, a box shape, a sphere shape, an ellipsoid shape, a cylinder shape.

In some embodiments, the set of metadata further comprises third metadata that describes a single point in the extended reality scene.

In some embodiments, the selection is based on one or more of the following: a distance between the audio object and the listening position of the listener in the extended reality scene and at least one threshold distance parameter (e.g., D1 or D2), a size of the audio object, the number of currently active audio objects in the extended reality scene, a current load of a renderer that will be used to render the audio object, or a current audio energy level of the audio object.

In some embodiments, transforming the obtained first metadata to produce the transformed metadata comprises determining a set of description points, wherein the set of description points comprises an anchor point and determining the 2D plane or 1D line using the description points, wherein the 2D plane or 1D lines passes through the anchor point. For many 3D shapes, the anchor point is within or on the 3D shape, but for some other 3D shapes (e.g. a concave shape) the anchor point is not on or within the 3D shape but is usually close to the 3D shape.

In some embodiments, the anchor point is a point on the surface of the 3D shape that is closest to the listening position of the listener in the extended reality scene.

In some embodiments, the anchor point is a spatial average of points on or within the 3D shape.

In some embodiments, a part of the shape is visible to the listener in the extended reality scene, and the anchor point is the centroid of the part of the shape that is visible to the listener.

In some embodiments, the set of description points further comprises a first point on the first 3D shape that represents a first edge of the first 3D shape with respect to the listening position of the listener, and a second point on the first 3D shape that represents a second edge of the first 3D shape with respect to the listening position.

In some embodiments, the method also comprises determining a dimension (e.g., width, height, length) of the 2D plane or 1D line based on the first and second points.

In some embodiments, the method further comprises determining a horizontal angle of the 2D plane or 1D line based on the first and second points.

In some embodiments, the set of description points further comprises a third point on the first 3D shape that represents a third edge of the first 3D shape with respect to the listening position, and a fourth point of the first 3D shape that represents a fourth edge of the first 3D shape with respect to the listening position.

In some embodiments, the method also comprises determining a dimension (e.g., width, height, length) of the 2D plane or 1D line based on the third and fourth points.

In some embodiments, the method further comprises determining a vertical angle of the 2D plane or 1D line based on the third and fourth points.

In some embodiments, the audio object is represented by a multi-channel audio signal, and the method further comprises rendering the multi-channel audio signal using the transformed metadata.

Figure 10:
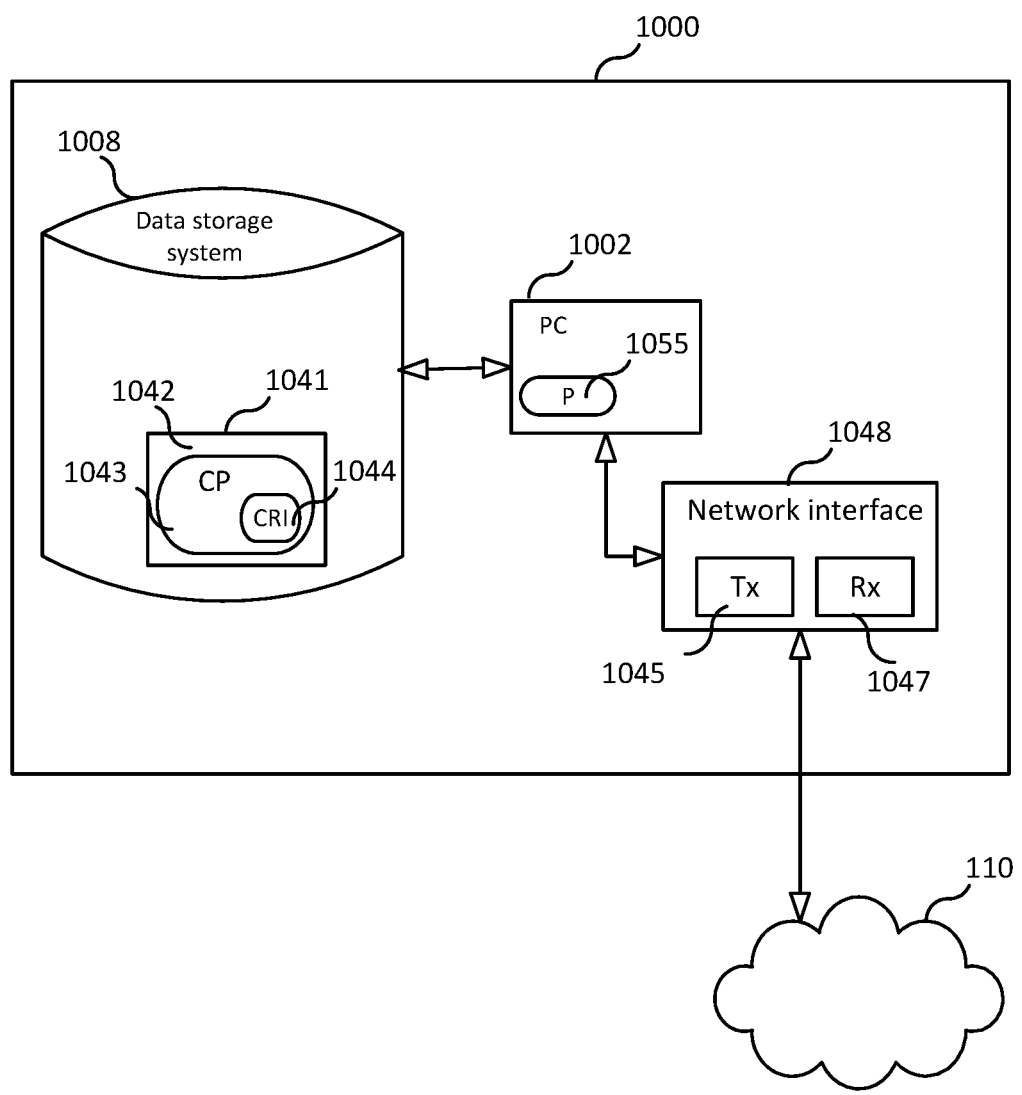
FIG. 10 shows an apparatus according to some embodiments.

FIG. 10 is a block diagram of an apparatus 1000, according to some embodiments, for performing the methods disclosed herein (e.g., renderer 700 may be implemented using apparatus 1000). As shown in FIG. 10, apparatus 1000 may comprise: processing circuitry (PC) 1002, which may include one or more processors (P) 1055 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1000 may be a distributed computing apparatus); at least one network interface 1048 comprising a transmitter (Tx) 1045 and a receiver (Rx) 1047 for enabling apparatus 1000 to transmit data to and receive data from other nodes connected to a network 110 (e.g., an Internet Protocol (IP) network) to which network interface 1048 is connected (directly or indirectly) (e.g., network interface 1048 may be wirelessly connected to the network 110, in which case network interface 1048 is connected to an antenna arrangement); and a storage unit (a.k.a., "data storage system") 1008, which may include one or more non-volatile storage devices and/or one or more volatile storage devices. In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes apparatus 1000 to perform steps described herein (e.g., steps described herein with reference to the flow charts). In other embodiments, apparatus 1000 may be configured to perform steps described herein without the need for code. That is, for example, PC 1002 may consist merely of one or more ASICs. Hence, the features of the embodiments described herein may be implemented in hardware and/or software.

5. Summary of Various Embodiments

A1. A method (900) for representing an audio object with respect to a listening position of a listener in an extended reality scene, the method comprising: obtaining (s902) first metadata describing a first three-dimensional (3D) shape associated with the audio object; and transforming (s904) the obtained first metadata to produce transformed metadata describing a two-dimensional (2D) plane or a one-dimensional (1D) line, wherein the 2D plane or the 1D line represent at least a portion of the audio object.

A2a. The method of embodiment A1, wherein obtaining the first metadata comprises selecting the first metadata from a set of metadata comprising the first metadata and second metadata that describes a second 3D shape associated with the audio object (in one embodiment, the second 3D shape described by the second metadata has fewer vertices than the first 3D shape described by the first metadata).

A2b. The method of embodiment A2a, wherein the second 3D shape is in the form of one of the following: a mesh structure with fewer vertices than the first 3D shape described by the first metadata, a box shape, a sphere shape, an ellipsoid shape, a cylinder shape.

A3. The method of embodiment A2a or A2b, wherein the set of metadata further comprises third metadata that describes a single point in the extended reality scene.

A4. The method of embodiment A2a, A2b, or A3, wherein the selection is based on one or more of the following: a distance between the audio object and the listening position of the listener in the extended reality scene and at least one threshold distance parameter, a size of the audio object, the number of currently active audio objects in the extended reality scene, a current load of a renderer that will be used to render the audio object, or a current audio energy level of the audio object.

A5. The method of any one of embodiments A1-A4, wherein transforming the obtained first metadata to produce the transformed metadata comprises: determining a set of description points, wherein the set of description points comprises an anchor point; and determining the 2D plane or 1D line using the description points, wherein the 2D plane or 1D lines passes through the anchor point.

A6. The method of embodiment A5, wherein the anchor point is a point on the surface of the 3D shape that is closest to the listening position of the listener in the extended reality scene.

A7. The method of embodiment A5, wherein the anchor point is a spatial average of points on or within the 3D shape.

A8. The method of embodiment A5, wherein a part of the shape is visible to the listener in the extended reality scene, and the anchor point is the centroid of the part of the shape that is visible to the listener.

A9. The method of any one of embodiments A5-A8, wherein the set of description points further comprises: a first point on the first 3D shape that represents a first edge of the first 3D shape with respect to the listening position of the listener, and a second point on the first 3D shape that represents a second edge of the first 3D shape with respect to the listening position.

A10. The method of embodiment A9, further comprising determining a dimension (e.g., width, height, length) of the 2D plane or 1D line based on the first and second points.

A11. The method of embodiment A9 or A10, further comprising determining a horizontal angle of the 2D plane or 1D line based on the first and second points.

A12. The method of any one of embodiments A5-A11, wherein the set of description points further comprises: a third point on the first 3D shape that represents a third edge of the first 3D shape with respect to the listening position, and a fourth point on the first 3D shape that represents a fourth edge of the first 3D shape with respect to the listening position.

A13. The method of embodiment A12, further comprising determining a dimension (e.g., width, height, length) of the 2D plane or 1D line based on the third and fourth points.

A14. The method of embodiment A12 or A13, further comprising determining a vertical angle of the 2D plane based on the third and fourth points.

A15. The method of any of the embodiments A5-A14, wherein a position of at least one description point is smoothed using a technique where the magnitude of the position change between two time instances is limited to be, at most, proportional to the magnitude of the change in relative distance between the audio object and the listener between the same two time instances.

A16. The method of embodiment A16, wherein a change of rotation of the extent of the audio object is taken into account by calculating an expected position change of the anchor point, and where the position change of a description point is limited to be, at most, proportional to the sum of the magnitude of this position change and the magnitude of the change in relative position between the audio object and the listener.

A17. The method of any one of embodiments A1-A16, wherein the audio object is represented by a multi-channel audio signal, and the method further comprises rendering the multi-channel audio signal using the transformed metadata.

A18. The method of embodiment A17, wherein the multi-channel audio signal is rendered using a virtual sound source that represents an edge of the 2D shape or 1D line.

A19. The method of embodiment A17 or A18, wherein the multi-channel audio signal is rendered using a virtual sound source that has an associated head related transfer function (HRTF) that represents a sub-area of the 2D shape or 1D line.

B1. An apparatus (1000) for representing an audio object in an extended reality scene, the apparatus being configured to: obtain (s902) first metadata describing a first three-dimensional (3D) shape associated with the audio object; and transform (s904) the obtained first metadata to produce transformed metadata describing a two-dimensional (2D) plane or a one-dimensional (1D) line, wherein the 2D plane or the 1D line represent at least a portion of the audio object.

B2. The apparatus of embodiment B1, wherein the apparatus is further configured to perform the method of any one of embodiments A2-A19.

B3. An apparatus (1000) for representing an audio object in an extended reality scene, the apparatus comprising: a storage unit (1008); and processing circuitry (1002) coupled to the storage unit, wherein the apparatus is configured to: obtain (s902) first metadata describing a first three-dimensional (3D) shape associated with the audio object; and transform (s904) the obtained first metadata to produce transformed metadata describing a two-dimensional (2D) plane or a one-dimensional (1D) line, wherein the 2D plane or the 1D line represent at least a portion of the audio object.

B4. The apparatus of embodiment B3, wherein the storage unit (1008) comprises memory (1042) that stores instructions for configuring the apparatus to perform the method of any one of embodiments A1-A19.

C1. A computer program (1043) comprising instructions which, when executed by processing circuitry (1002), cause the processing circuitry to perform the method of any one of embodiments A1-A19.

C2. A carrier containing the computer program of embodiment C1, wherein the carrier is one of an electronic signal, an optical signal, a radio signal, or a computer readable storage medium (1042).

While various embodiments are described herein, it should be understood that they have been presented by way of example only, and not limitation. Thus, the breadth and scope of this disclosure should not be limited by any of the above described exemplary embodiments. Moreover, any combination of the above-described objects in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] MPEG-H 3D Audio, Clause 8.4.4.7: "Spreading"
[2] MPEG-H 3D Audio, Clause 18.1: "Element Metadata Preprocessing"
[3] MPEG-H 3D Audio, Clause 18.11: "Diffuseness Rendering"
[4] EBU ADM Renderer Tech 3388, Clause 7.3.6: "Divergence"
[5] EBU ADM Renderer Tech 3388, Clause 7.4: "Decorrelation Filters"
[6] EBU ADM Renderer Tech 3388, Clause 7.3.7: "Extent Panner"
[7] Efficient HRTF-based Spatial Audio for Area and Volumetric Sources", IEEE Transactions on Visualization and Computer Graphics 22(4):1-1 Jan. 2016
[8] "Surface Simplification Using Quadric Error Metrics", ACM SIGGRAPH Computer Graphics, July 1997
[9] "Minimum volume bounding box decomposition for shape approximation in robot grasping", 2008 IEEE International Conference on Robotics and Automation.

The invention claimed is:

1. A method for representing an audio object with respect to a listening position of a listener in an extended reality scene, the method comprising:
   obtaining first metadata describing a first three-dimensional (3D) shape associated with the audio object; and
   transforming the obtained first metadata, which describes the first 3D shape associated with the audio object, to produce transformed metadata describing a two-dimensional (2D) plane or a one-dimensional (1D) line, wherein
   the 2D plane or the 1D line represent at least a portion of the audio object,
   transforming the obtained first metadata to produce the transformed metadata comprises determining an anchor point, the anchor point being a point on the 3D shape that is deemed closest to the listening position of the listener in the extended reality scene,
   the 2D plane or 1D lines passes through the anchor point,
   transforming the obtained first metadata to produce the transformed metadata further comprises:
     determining a first point on the first 3D shape that represents a first edge of the first 3D shape with respect to the listening position of the listener,
     determining a second point on the first 3D shape that represents a second edge of the first 3D shape with respect to the listening position of the listener, and
     determining a first property of the 2D plane or 1D line based on the first and second points, and
   the method further comprises:
     prior to determining the first point on the first 3D shape and the second point on the first 3D shape, determining a line between the listening position of the listener and the anchor point; and
     using the determined line to determine the first point on the first 3D shape and the second point on the first 3D shape, wherein
     the first point on the first 3D shape has a highest azimuth angle relative to the line between the listening position of the listener and the anchor point, and
     the second point on the first 3D shape has a lowest azimuth angle relative to the line between the listening position of the listener and the anchor point.

2. The method of claim 1, wherein
obtaining the first metadata comprises selecting the first metadata from a set of metadata comprising the first metadata that describes the first 3D shape associated with the audio object and second metadata that describes a second 3D shape associated with the audio object, wherein the second 3D shape is different than the first 3D shape.

3. The method of claim 2, wherein the second 3D shape is in the form of one of the following:
a mesh structure with fewer vertices than the first 3D shape described by the first metadata,
a box shape,
a sphere shape,
an ellipsoid shape,
a cylinder shape.

4. The method of claim 2, wherein the set of metadata further comprises third metadata that describes a single point in the extended reality scene.

5. The method of claim 2, wherein the selection is based on one or more of the following:
a distance between the audio object and the listening position of the listener in the extended reality scene and at least one threshold distance parameter,
a size of the audio object,
the number of currently active audio objects in the extended reality scene,
a current load of a renderer that will be used to render the audio object, or
a current audio energy level of the audio object.

6. The method of claim 1, wherein determining the first property of the 2D plane or 1D line based on the first and second points comprises determining a first dimension of the 2D plane or 1D line based on the first and second points.

7. The method of claim 6, wherein transforming the obtained first metadata to produce the transformed metadata further comprises:
determining a third point on the first 3D shape that represents a third edge of the first 3D shape with respect to the listening position of the listener,
determining a fourth point on the first 3D shape that represents a fourth edge of the first 3D shape with respect to the listening position, and
determining a second dimension of the 2D plane or 1D line based on the third and fourth points.

8. The method of claim 1, wherein
determining the first property of the 2D plane or 1D line based on the first and second points comprises determining a horizontal angle of the 2D plane or 1D line based on the first and second points.

9. The method of claim 8, wherein transforming the obtained first metadata to produce the transformed metadata further comprises:
determining a third point on the first 3D shape that represents a third edge of the first 3D shape with respect to the listening position of the listener,
determining a fourth point on the first 3D shape that represents a fourth edge of the first 3D shape with respect to the listening position, and
determining a vertical angle of the 2D plane or 1D line based on the third and fourth points.

10. The method of claim 1, wherein a position of the first point is smoothed using a technique where the magnitude of the position change between two time instances is limited to be, at most, proportional to the magnitude of the change in relative distance between the audio object and the listener between the same two time instances.

11. The method of claim 10, wherein a change of rotation of the extent of the audio object is taken into account by calculating an expected position change of the anchor point, and where the position change of the first point is limited to be, at most, proportional to the sum of the magnitude of the expected position change of the anchor point and the magnitude of the change in relative position between the audio object and the listener.

12. The method of claim 1, wherein
the audio object is represented by a multi-channel audio signal, and
the method further comprises rendering the multi-channel audio signal using the transformed metadata.

13. The method of claim 12, wherein the multi-channel audio signal is rendered using a virtual source that represents an edge of the 2D shape or 1D line.

14. The method of claim 12, wherein the multi-channel audio signal is rendered using a virtual sound source that has an associated head related transfer function (HRTF) that represents a sub-area of the 2D shape or 1D line.

15. A non-transitory computer readable storage medium storing a computer program comprising instructions which, when executed by processing circuitry of an apparatus causes the apparatus to perform the method of claim 1.

16. The method of claim 1, wherein determining the anchor point comprises:
evaluating a set of points to identify which point in the set of points is closest to the listening position, wherein
the anchor point is the point in the set of points that is identified as being closest to the listening position, and
each point in the set of points represents a vertex of the first 3D shape or is a point on a surface of the first 3D shape.

17. The method of claim 1, wherein
determining the anchor point comprises determining a point on the first 3D shape that is closest to the listening position, and
the anchor point is the point on the first 3D shape that is determined to be closest to the listening position.

18. An apparatus for representing an audio object in an extended reality scene, the apparatus comprising:
a storage unit; and
processing circuitry coupled to the storage unit, wherein the apparatus is configured to perform a method comprising:
obtaining first metadata describing a first three-dimensional (3D) shape associated with the audio object; and
transforming the obtained first metadata to produce transformed metadata describing a two-dimensional (2D) plane or a one-dimensional (1D) line, wherein
the 2D plane or the 1D line represent at least a portion of the audio object,
transforming the obtained first metadata to produce the transformed metadata comprises determining an anchor point, the anchor point being a point on the surface of the 3D shape that is deemed closest to the listening position of the listener in the extended reality scene,
the 2D plane or 1D lines passes through the anchor point,
transforming the obtained first metadata to produce the transformed metadata further comprises:
determining a first point on the first 3D shape that represents a first edge of the first 3D shape with respect to the listening position of the listener,
determining a second point on the first 3D shape that represents a second edge of the first 3D shape with respect to the listening position of the listener, and determining a first property of the 2D plane or 1D line based on the first and second points, and the method further comprises:

prior to determining the first point on the first 3D shape and the second point on the first 3D shape, determining a line between the listening position of the listener and the anchor point; and using the determined line to determine the first point on the first 3D shape and the second point on the first 3D shape, wherein the first point on the first 3D shape has a highest azimuth angle relative to the line between the listening position of the listener and the anchor point, and the second point on the first 3D shape has a lowest azimuth angle relative to the line between the listening position of the listener and the anchor point.

19. The apparatus of claim 18, wherein the storage unit comprises memory that stores instructions for configuring the apparatus to obtain the first metadata by selecting the first metadata from a set of metadata comprising the first metadata and second metadata that describes a second 3D shape associated with the audio object.

* * * * *